United States Patent
Buttazzoni et al.

(10) Patent No.: US 9,010,798 B2
(45) Date of Patent: Apr. 21, 2015

(54) SELF-CONTAINED DOLLY ASSEMBLY

(71) Applicants: Luca Buttazzoni, Miami, FL (US); Andres Bernal, Sunny Isles, FL (US)

(72) Inventors: Luca Buttazzoni, Miami, FL (US); Andres Bernal, Sunny Isles, FL (US)

(73) Assignee: Luca Buttazzoni, Miami, FL (US)

( * ) Notice: Subject to any disclaimer, the term of this patent is extended or adjusted under 35 U.S.C. 154(b) by 0 days.

(21) Appl. No.: 13/755,494

(22) Filed: Jan. 31, 2013

(65) Prior Publication Data
US 2014/0021691 A1     Jan. 23, 2014

Related U.S. Application Data

(60) Provisional application No. 61/674,430, filed on Jul. 23, 2012.

(51) Int. Cl.
   *B62B 3/02*       (2006.01)
   *B62B 3/00*       (2006.01)
   *B62B 5/00*       (2006.01)

(52) U.S. Cl.
CPC ................. *B62B 3/00* (2013.01); *B62B 5/0093* (2013.01); *B62B 3/02* (2013.01); *B62B 2205/04* (2013.01); *B62B 2205/104* (2013.01)

(58) Field of Classification Search
CPC ............ B62B 2205/00; B62B 2205/02; B62B 2205/10; B62B 5/0093; B62B 3/008; B62B 3/022; B62B 3/02
USPC ...................................... 280/79.11, 79.3, 638
See application file for complete search history.

(56) References Cited

U.S. PATENT DOCUMENTS

| | | | |
|---|---|---|---|
| 123,147 A | 1/1872 | Blackman |
| 189,531 A | 4/1877 | Voorhees |
| 208,650 A | 10/1878 | Tucker |
| 217,172 A | 7/1879 | Tucker |
| RE9,283 E | 7/1880 | Woodruff |
| 357,406 A | 2/1887 | Nelms |
| 375,406 A | 12/1887 | Wilson et al. |
| 378,135 A | 2/1888 | Hess |
| 442,825 A | 12/1890 | Randall |
| 444,020 A | 1/1891 | Rogers et al. |
| 511,793 A | 1/1894 | Philion |

(Continued)

FOREIGN PATENT DOCUMENTS

| | | |
|---|---|---|
| GB | 2423012 | 8/2006 |
| JP | 6293201 | 10/1994 |

*Primary Examiner* — J. Allen Shriver, II
*Assistant Examiner* — Travis Coolman
(74) *Attorney, Agent, or Firm* — Malloy & Malloy, P.L.

(57) ABSTRACT

A dolly assembly including a plurality of hollow interior guide members and one or more rail members, cooperatively structured, configured and dimensioned to be selectively disposed in an operative, weight supporting orientation or a self-contained orientation of reduced dimension and configuration, which facilitates storage. The operative orientation comprises the one or more rail member removably interconnecting the two guide members in spaced relation to one another, wherein a plurality of castors are removably connected to and disposed in movable supporting relation with the interconnected guide and rail members, when in the operative orientation. The self-contained orientation comprises the guide members detached from the operative orientation and the guide members removably connected in confronting, predetermined facing relation to one another, such that the rail members and castors are enclosed within one or both of the hollow interiors of the confronting guide members.

17 Claims, 10 Drawing Sheets

(56) References Cited

U.S. PATENT DOCUMENTS

| | | | |
|---|---|---|---|
| 520,319 A | 5/1894 | Kynoch | |
| 525,298 A | 8/1894 | Thiele et al. | |
| 600,172 A | 3/1898 | Rechtsteiner | |
| 843,234 A | 2/1907 | Rawlinson | |
| 970,386 A | 9/1910 | Nickerson | |
| 1,265,850 A | 5/1918 | Wierszewska | |
| 1,364,423 A * | 1/1921 | Brown | 280/20 |
| 1,461,027 A | 7/1923 | Brockson | |
| 1,508,232 A | 9/1924 | Milosy | |
| 1,887,067 A | 11/1932 | Pehrsson | |
| 1,891,393 A * | 12/1932 | Oppenlander | 108/189 |
| 1,918,604 A | 7/1933 | Johnson | |
| 1,942,112 A | 1/1934 | McQuilkin | |
| 2,048,608 A | 7/1936 | Holland | |
| 2,186,368 A | 1/1940 | Conger | |
| 2,423,711 A | 7/1947 | Knox | |
| 2,490,879 A | 12/1949 | Milich | |
| 2,500,215 A | 3/1950 | Swearingen | |
| 2,534,367 A | 12/1950 | Perrotta et al. | |
| 2,575,189 A | 11/1951 | Schmidt | |
| 2,654,421 A | 10/1953 | Neff | |
| 2,661,220 A | 12/1953 | Davis | |
| D177,208 S | 3/1956 | Berlin | |
| 2,830,824 A | 4/1958 | Young | |
| 2,849,241 A | 8/1958 | Owen | |
| 3,007,710 A | 11/1961 | Sykes | |
| 3,202,438 A * | 8/1965 | Panknin et al. | 280/42 |
| 3,285,447 A | 11/1966 | Junion | |
| 3,329,442 A | 7/1967 | Di Vietri | |
| 3,367,675 A | 2/1968 | Gearin | |
| 3,389,421 A | 6/1968 | Wheeler | |
| 3,522,951 A | 8/1970 | Tyson | |
| 3,552,761 A * | 1/1971 | Sjoblom | 280/42 |
| 3,559,802 A | 2/1971 | Eidus | |
| 3,577,620 A | 5/1971 | Hoffman et al. | |
| 3,802,717 A | 4/1974 | Eitreim | |
| 3,831,959 A | 8/1974 | Fontana | |
| 3,871,676 A | 3/1975 | Renard et al. | |
| 3,923,318 A | 12/1975 | Renard et al. | |
| 3,963,256 A | 6/1976 | Stafford | |
| 3,964,762 A | 6/1976 | Adams | |
| 3,983,821 A | 10/1976 | Kearns | |
| 4,023,816 A | 5/1977 | Ellman et al. | |
| 4,178,006 A | 12/1979 | Johnson | |
| 4,274,644 A | 6/1981 | Taylor | |
| 4,285,550 A | 8/1981 | Blackburn et al. | |
| 4,381,054 A | 4/1983 | Rumpel | |
| 4,382,637 A | 5/1983 | Blackburn et al. | |
| 4,392,665 A | 7/1983 | Miller et al. | |
| 4,402,506 A | 9/1983 | Jones | |
| 4,540,196 A * | 9/1985 | Paping et al. | 280/646 |
| 4,576,389 A | 3/1986 | Villaveces et al. | |
| 4,647,056 A | 3/1987 | Baker | |
| 4,720,115 A | 1/1988 | Rehrig | |
| 4,725,028 A | 2/1988 | Conradt | |
| 4,743,039 A | 5/1988 | Ellis | |
| 4,778,041 A | 10/1988 | Blaurock | |
| 4,799,288 A | 1/1989 | Kimizawa | |
| 4,824,129 A | 4/1989 | Rehrig | |
| 4,969,657 A | 11/1990 | Kaufmann | |
| 4,996,738 A | 3/1991 | Tifre | |
| 5,033,758 A | 7/1991 | Levy | |
| 5,040,809 A * | 8/1991 | Yang | 280/42 |
| 5,123,665 A | 6/1992 | Levy | |
| 5,144,708 A | 9/1992 | Pekar | |
| 5,219,058 A | 6/1993 | Sundseth | |
| 5,230,408 A | 7/1993 | Sadow | |
| 5,299,817 A * | 4/1994 | Chang | 280/35 |
| 5,318,312 A | 6/1994 | Montemayor | |
| 5,379,485 A | 1/1995 | Oshins et al. | |
| 5,393,079 A | 2/1995 | Wang | |
| 5,564,143 A | 10/1996 | Pekar et al. | |
| 5,599,031 A | 2/1997 | Hodges | |
| 5,726,368 A | 3/1998 | Shaw | |
| 5,737,801 A | 4/1998 | Flood | |
| 5,803,471 A | 9/1998 | DeMars et al. | |
| 5,829,765 A * | 11/1998 | Snider | 280/42 |
| 6,038,734 A | 3/2000 | Facchin | |
| 6,095,533 A * | 8/2000 | Balolia | 280/35 |
| 6,095,534 A | 8/2000 | Wong | |
| 6,134,747 A | 10/2000 | Leibman | |
| 6,179,374 B1 | 1/2001 | Tang | |
| 6,354,619 B1 | 3/2002 | Kim | |
| 6,371,496 B1 * | 4/2002 | Balolia | 280/35 |
| 6,382,643 B1 | 5/2002 | Baker | |
| 6,419,198 B1 | 7/2002 | Einav | |
| 6,491,318 B1 | 12/2002 | Galt et al. | |
| 6,772,478 B2 | 8/2004 | Herder et al. | |
| 6,776,382 B1 | 8/2004 | Papadopoulos et al. | |
| 6,877,622 B2 | 4/2005 | Tsai | |
| 6,923,466 B2 * | 8/2005 | Tsai | 280/646 |
| 6,942,605 B1 | 9/2005 | Sukhovitsky | |
| 6,955,368 B2 * | 10/2005 | Bakhoum | 280/79.3 |
| 6,964,423 B1 | 11/2005 | Chieh et al. | |
| 7,036,161 B2 | 5/2006 | Harrison et al. | |
| 7,055,847 B2 | 6/2006 | Miller et al. | |
| 7,188,859 B2 | 3/2007 | Hardin et al. | |
| 7,305,737 B2 | 12/2007 | Libakken | |
| 7,360,783 B2 * | 4/2008 | Home | 280/639 |
| 7,374,186 B2 * | 5/2008 | Mason et al. | 280/79.11 |
| 7,421,956 B1 | 9/2008 | McCarthy et al. | |
| 7,441,786 B2 | 10/2008 | Stryker et al. | |
| 7,478,835 B2 | 1/2009 | Autenrieth | |
| 7,547,037 B2 | 6/2009 | Poppinga et al. | |
| 7,621,858 B2 | 11/2009 | Sheron | |
| 8,011,686 B2 | 9/2011 | Chen et al. | |
| 8,025,299 B2 * | 9/2011 | Hiltz | 280/32.6 |
| 8,096,566 B2 | 1/2012 | West | |
| 8,205,841 B2 | 6/2012 | Wood | |
| 8,220,824 B2 | 7/2012 | Chen et al. | |
| 8,567,795 B2 * | 10/2013 | Megens | 280/35 |
| 8,684,372 B2 | 4/2014 | Buttazzoni | |
| 2003/0034636 A1 | 2/2003 | Ng | |
| 2003/0155389 A1 | 8/2003 | Swartzentruber | |
| 2004/0173996 A1 | 9/2004 | Anderson | |
| 2005/0071949 A1 | 4/2005 | Martinez et al. | |
| 2005/0211862 A1 | 9/2005 | Autenrieth | |
| 2006/0091632 A1 * | 5/2006 | Buck | 280/79.11 |
| 2006/0097468 A1 | 5/2006 | Sugrue | |
| 2006/0279054 A1 | 12/2006 | Chung et al. | |
| 2007/0029747 A1 | 2/2007 | Islo et al. | |
| 2007/0284900 A1 * | 12/2007 | Sze | 296/26.15 |
| 2009/0167008 A1 | 7/2009 | Autenrieth | |
| 2009/0178821 A1 | 7/2009 | Zavidniak et al. | |
| 2009/0184482 A1 | 7/2009 | Scott | |
| 2009/0212514 A1 | 8/2009 | Moorman, Jr. | |
| 2010/0066057 A1 | 3/2010 | Jian | |
| 2010/0237575 A1 | 9/2010 | Price et al. | |
| 2011/0089671 A1 | 4/2011 | Baatz et al. | |
| 2012/0013105 A1 | 1/2012 | Freeman et al. | |
| 2012/0087216 A1 | 4/2012 | Keung et al. | |
| 2014/0021691 A1 | 1/2014 | Buttazzoni et al. | |

* cited by examiner

SELF-CONTAINED DOLLY ASSEMBLY

CLAIM OF PRIORITY

The present application is based on and a claim of priority is made under 35 U.S.C. Section 119(e) to a provisional patent application that is currently in the U.S. Patent and Trademark Office, namely, that having Ser. No. 61/674,430 and a filing date of Jul. 23, 2012, and which is incorporated herein by reference in its entirety.

BACKGROUND OF THE INVENTION

1. Field of the Invention

The present invention is directed to a dolly or movable platform for carrying loads. The dolly assembly of the present invention comprises a relatively small number of components which are cooperatively dimensioned and structured to be selectively disposed in either an operative, weight supporting orientation or a self-contained orientation. In the operative orientation, one or more rail members are removably interconnected with a plurality of at least two guide members in spaced relation to one another, and a plurality of castors are connected thereto and movably support the dolly. In the self-contained orientation, the aforesaid components are detached and the rail members are disposed within the guide members, wherein the hollow interiors of the guide members are in facing, direct communicating relation, with one another.

2. Description of the Related Art

The use of dolly structures is quite common for different applications and across a variety of different industries. As such, dolly structures can be generally categorized as platform dollies, hand trucks, mobile carts, etc. In each instance, these different types of dollies are intended for use in movably supporting different types of objects over various surfaces, and further, the objects being movably supported may vary in weight, size, configuration, etc. Therefore, the selection of a particular type of dolly will usually depend on the physical characteristics of the object with which the dolly is intended to be used.

By way of example, platform dollies usually have a relatively large platform supported by a plurality of wheels, rollers, castors, etc., which are fixedly secured to the under portion of the platform. In contrast, hand trucks normally comprise an elongated, vertically extending, upper portion attached to a lower portion having an outwardly extending supporting platform. As with platform dollies, the hand truck usually includes fixedly or permanently attached wheels connected generally at the junction of the upper and lower portions. Somewhat similarly, movable carts for supporting one or more objects of different weights may also be considered a dolly structure. Weight supporting carts normally include a supporting base and a retaining structure associated therewith in a manner which facilitates the movable support of one or more different objects. Similar to the other dollies noted herein, these cart types of dollies also normally include a plurality of wheels, rollers, castors, etc. which are fixedly attached to the cart.

Importantly, however, each of the above noted types of dolly structures is typically fixed in their configuration and not structured to be reduced in size, such as by being collapsed or at least partially disposed into a folded, reduced size configuration, which would facilitate storage, transportation and overall handling thereof, when the dolly structure is not being used.

Therefore, problems and disadvantages associated with known or conventional dolly structures typically include their inability to be disposed into a collapsed or reduced size orientation when not in use. Further, it is generally acknowledged that prior art dolly structures may be configured to movably support a variety of different articles. However, a prominent consideration in the design and structuring of conventional dollies is the weight, size and shape of the devices being supported. In turn such considerations will most probably affect the size, configuration of and overall weight bearing abilities of the dolly being used. By way of example, large platform dollies are generally intended to accommodate large and/or relatively heavy devices which may also have a bulking shape or configuration. Accordingly, dollies of this type are not easily collapsed or reduced in size to facilitate the aforementioned storage or transport when not in use.

In turn, lighter weight or smaller dolly structures including, but not limited to, cart type dollies and hand trucks may be structured to movably support smaller relatively lighter loads than the aforementioned platform dollies. As a result these type of dollies may include at least some adjustable features or components in order to facilitate the handling thereof. However, such adjustable features may be only minimally operative to significantly reduce the size and configuration thereof. As a result, dollies of this type are not normally structured to be disposed in a sufficiently collapsed orientation, of sufficiently reduced size and configuration, to permit their efficient and effective storage, transport, etc., either individually of collectively.

Therefore, there is a need in the area associated with the design and manufacture of dollies for a dolly assembly structured to be easily, quickly and reliably disposed between an operative, weight supporting orientation into a self-contained orientation, which facilitates storage, transportation and handling when not in use. Such a proposed and improved dolly assembly will have cooperatively dimensioned and structured components which can be easily and quickly assembled the operative orientation for the movable support of objects which may vary in size, weight or configuration. However, when not in use such a proposed and improved dolly assembly could be designed and structured to include some components which serve to enclose and/or retain other components in a manner which facilitates a "self containment" of dolly assembly, when not in use. Further, when selectively disposed in the self-contained orientation the various components of the dolly structure do not have to be deformed, structurally altered or modified. As a result, the dolly assembly can be quickly, easily reliably disposed in the operative orientation when needed for use.

Finally, the structural and operative features of a preferred dolly structure will be such as to overcome the disadvantages and problems long recognized in the use of conventional or known dolly structures of the type generally described above. As such, the self-contained orientation of the various components of the proposed dolly structure would be such as to assume a more efficient "footprint" comprising a significantly reduced size and configuration. Therefore, when in the self-contained orientation, storage and/or transport of such a proposed dolly assembly could be accomplished in a significantly reduced area or volume. Also, a plurality of the proposed dolly assemblies could be the collectively transported, stored, etc. in a variety of appropriately configured and sized groupings.

SUMMARY OF THE INVENTION

The present invention is directed to a dolly assembly selectively disposable in either an operative, weight supporting orientation or a self-contained orientation. More specifically, the dolly assembly includes a plurality of at least two elongated guide members, each having a hollow interior extending along the length thereof. In addition, the dolly assembly further includes at least one, but preferably a plurality, of at least two elongated rail members. The at least two guide members and the one or more rail members are cooperatively structured, dimensioned and configured to assume either the aforementioned, weight supporting orientation or self-contained orientation.

In at least one preferred embodiment, the operative orientation comprises a plurality of two elongated rail members each removably interconnecting the two guide members to one another in a spaced relation. Similarly, the interconnecting rail members are also disposed in spaced relation to one another so as to define a configuration of the operative orientation, which is effective to support the weight of an object. Moreover, the overall size and configuration of the dolly, when in the operative orientation, may vary so as to movably support a different objects or devices which may differ in size, weight and shape. Such variances in the physical characteristics of one or more embodiments of the dolly assembly may be accomplished by adjusting the sizes and/or relative positions of the guide and rail members. As a result the dolly assembly may assume an operative orientation which is appropriate to accommodate the object to be supported. As set forth in greater detail hereinafter, at least one preferred embodiment comprises the at least some of the guide members being substantially equivalently structured relative to one another and similarly at least some of the rail members being substantially equivalently structured. However, while maintaining such equivalent structuring, the various components of the dolly assembly may be produced and made available in a variety of sizes so as to enhance its use in movably supporting small, medium and large sized devices.

The mobility of the dolly assembly is accomplished by providing a plurality of castors removably connected to an under portion thereof. More specifically, the castors may be removably connected to the dolly at the interconnecting junctions between the aforementioned rail members and guide members and in at least one embodiment facilitate a removable connection there between. In order to more effectively enhance the strength or weight bearing characteristics of the various embodiments of the dolly assembly, the castors may be more specifically defined as "in-line" castors such as ball castors or roller ball type castors. However, the various embodiments of the dolly assembly are effective for their intended operation by using a variety of mobile supports including "off-set" castors, such as wheel or roller castors as explained in greater detail herein after.

As generally indicated herein, conventional or known dolly structures typically include a substantially fixed support platform having a predetermined size and configuration. Also known dolly structures include a mobile support assembly which is fixedly attached in a predetermined location so as to provide adequate support to the components thereof as well as the object being supported. Therefore, dolly structures of this type are not effectively capable of being reduced in size and/or configuration to facilitate a more efficient storage, transport and/or handling thereof. The structural and operative features of the preferred embodiments of the present invention overcome such disadvantages by cooperatively structuring the various components thereof including, but not limited to, the plurality of guide members, rail members, castors, etc. As indicated above, the cooperatively structured components of the dolly assembly facilitate their removable connection and selected disposition into either the aforementioned operative orientation or the self-contained orientation.

Accordingly, one or more advantages of the present invention include a significant reduction in the size and configuration of the dolly assembly when in the self-contained orientation, thereby facilitating the storage, transportation and handling of one or a plurality of such dolly assemblies, when not in use.

In more specific terms, each of the at least two guide members are dimensioned to be sufficiently larger, at least in transverse dimension and possibly also in length, than the rail members. The increased size should be sufficient to retain and at least partially enclose the length of the rail members within and in substantially longitudinal alignment with the hollow interiors of the guide members. Moreover, in at least one embodiment each of the guide members may be sufficiently longer than the rail member(s) to retain and enclose one or more of the plurality of castors, once detached from the operative orientation, concurrently with at least one of the rail members, within the hollow interior(s) thereof. In yet another embodiment, each or at least one of the guide members may have a length substantially equal to or appropriately greater than a corresponding rail member of the dolly assembly. In this embodiment, the one or more guide members have a length sufficient to retain at least one rail member. Accordingly, the self-contained orientation of this embodiment is structured to position one or more castors within a hollow interior of one or more rail members, wherein the rail member (s) are then disposed within the hollow interior of one or more guide members. Therefore, in one or more embodiments of the present invention, the self-contained orientation comprises all of the components, including the rail members, castors, et., being completely or at least partially enclosed within the guide members, in the manner described in greater detail hereinafter.

In addition, the elongated hollow interior of each guide member preferably, but not necessarily, extends along the entire length thereof. Further, each of the guide members includes an open longitudinal side extending along the entire or at least a sufficient length of the hollow interior to allow passage there through of a rail member and possibly a castor. Therefore, at least one preferred embodiment of the dolly assembly comprises the self-contained orientation including each of the guide members having at least one rail member retained and at least partially enclosed within its hollow interior, concurrently with or independently of the retaining of at least some of the plurality of castors therein.

Due to the existence of an open longitudinal side in each of the guide members, the self-contained orientation may be further defined by a removable connection of the guide members in facing, confronting relation to one another. When so connected, the open longitudinal and hollow interiors thereof are disposed in direct facing, communicating relation with one another. Therefore, when in the self-contained orientation, the plurality of rail member and the plurality of castors will be enclosed, preferably in their entirety, within the hollow interiors of the removably connected and confronting guide members. As a result, the dolly assembly will have a significantly reduced "footprint" or size and configuration which significantly enhance its ability to be efficiently stored and/or transported in storage areas or transportation facilities having a reduced size and configuration. Further, efficiency in storage and/or transportation can be further enhanced by concurrently stacking, grouping or otherwise arranging a plurality of such dolly assemblies, each of which are in the self-contained orientation.

It should be noted that one or more preferred embodiments of the dolly assembly of the present invention will be primarily described utilizing a plurality of at least two guide members and a plurality of at least two rail members. However, the structural versatility and operational effectiveness of yet another embodiment of the dolly assembly can be demonstrated by the use of a single rail member disposed in removably, interconnecting relation to two spaced guide members. In such a structural variation, the at least one rail member may be removably interconnected in transverse relation to the spaced guide members to define the operative orientation. When disposed in an operative, weight supporting orientation, an appropriate number of castors may be strategically placed about the under portion of the dolly assembly, such that it is reliably stable and the various components thereof are fixedly but removably interconnected.

It is further emphasized that at least one embodiment of the present invention comprises at least some of the same components of the dolly assembly being equally dimensioned and configured. More specifically, each of the two or more guide members may be structured to be substantially equally dimensioned and configured with one another. Similarly, each of the two or more rail members may be structured to be equally dimensioned and configured with one another. This feature will have the benefit of facilitating the design and/or manufacture of the dolly assembly by requiring the structuring of the guide members and/or the rail members to be substantially identical. As a result, the manufacture of a plurality of guide members having different sizes and shapes and/or a plurality of rail members having different sizes and/or shapes will not be necessary.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
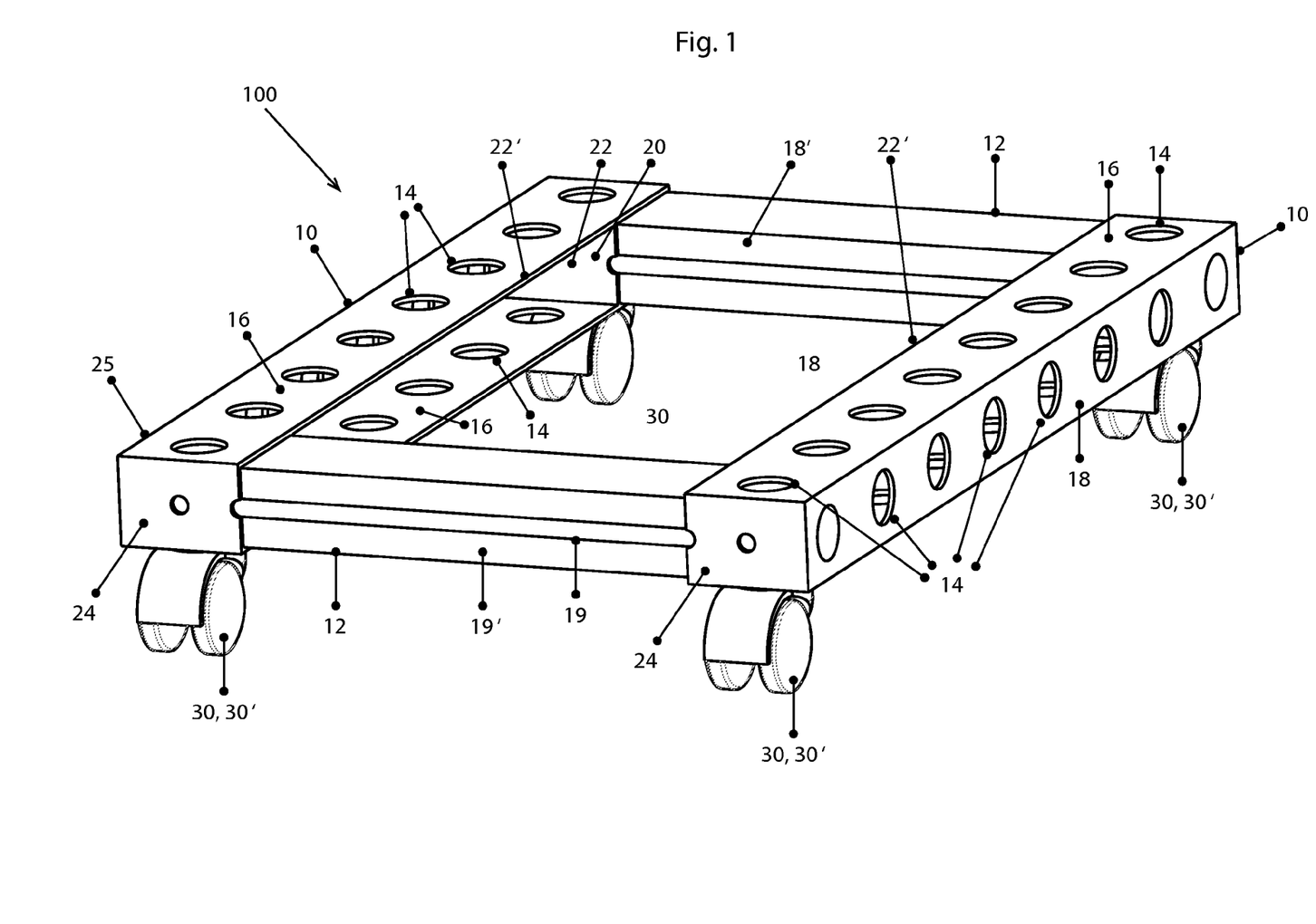
FIG. 1 is a perspective view of one preferred embodiment of the dolly assembly in an operative, weight supporting orientation.
Figures 4, 5:
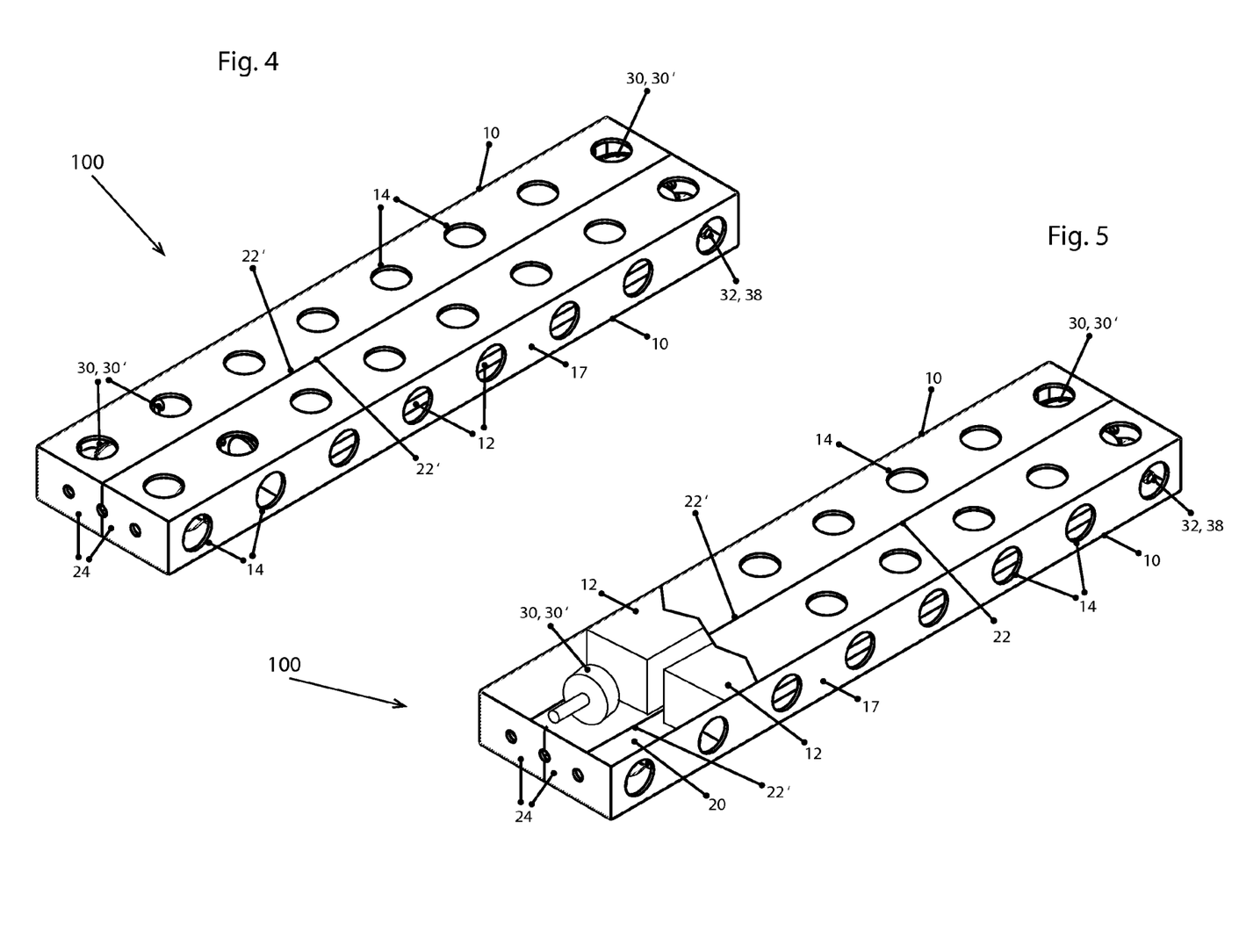
FIG. 4 is a perspective view of the embodiment of FIG. 1 in a self-contained orientation.
FIG. 5 is a perspective interior view in partial cutaway of the embodiment of FIG. 4.
Figure 6:
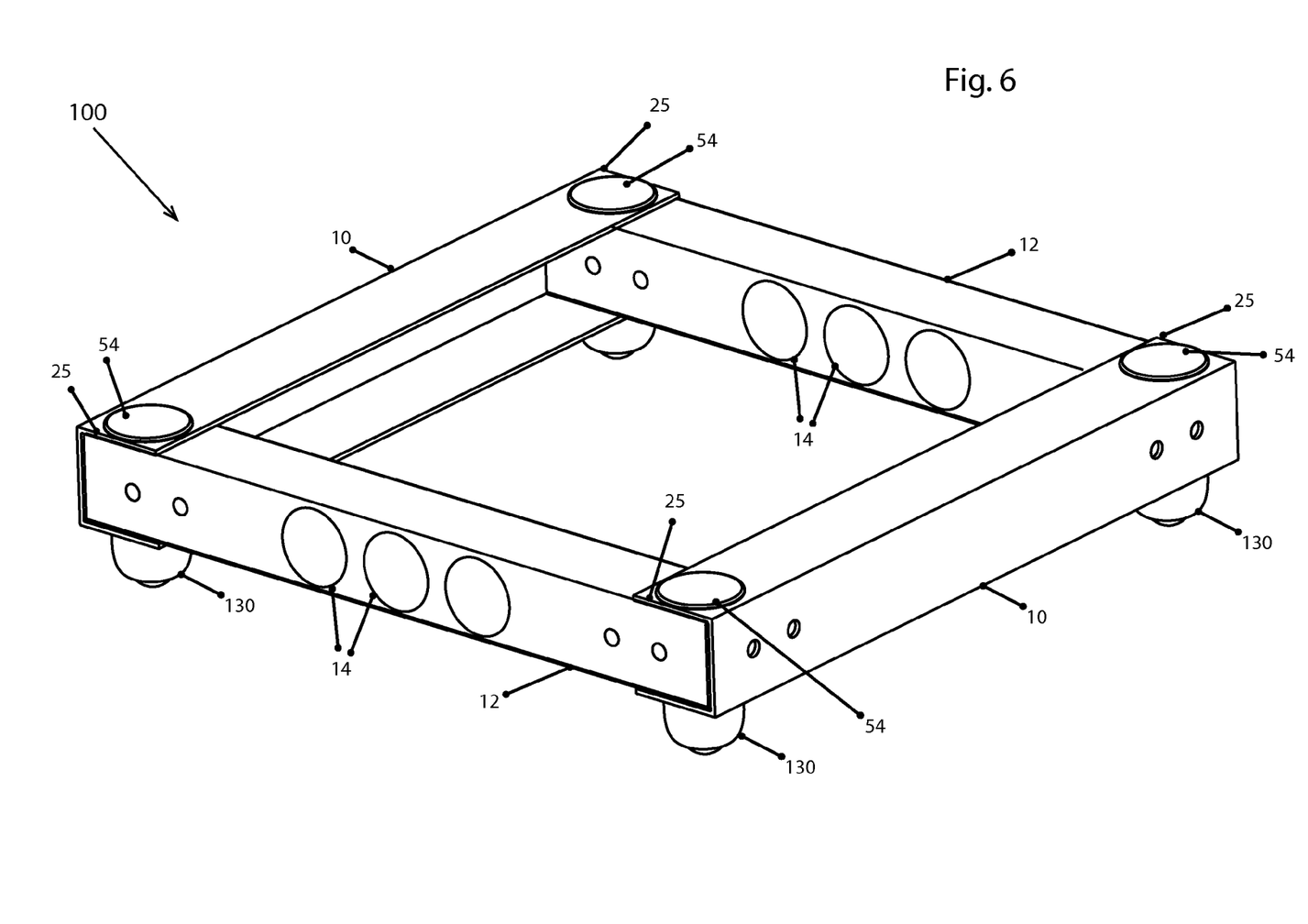
FIG. 6 is a perspective view of yet another embodiment of the dolly assembly of the present invention in an operative orientation.

As represented in the accompanying drawings, the present invention comprises at least one preferred embodiment of a dolly assembly generally indicated as 100. The dolly assembly 100 is structured to be selectively disposed into an operative, weight supporting orientation, as represented in FIG. 1, or a self-contained orientation, as represented in FIGS. 4 and 5. As explained in greater detail hereinafter, the self-contained orientation of the dolly assembly 100 has a significantly reduced size and overall configuration, thereby facilitating storage and/or transport of one or a plurality of the dolly assemblies, when not in use.

With primary reference to FIG. 1, the dolly assembly 100 includes a plurality of at least two guide members 10 and at least one, but in many practical applications, a plurality of at least two rail members 12. The material from which the rail and guide members 10 and 12 are formed may include metal, plastic, composite and a variety of other materials or a combination thereof. However, the material utilized should include sufficient strength, rigidity and weight bearing characteristics to allow the dolly assembly 100 to support objects which may differ in size, weight, shape, etc., when the dolly assembly 100 is in the operative weight supporting orientation. In at least one embodiment, numerous structural modifications may be made in the guide members 10 and/or rail members 12 such as, but not limited to, a plurality of apertures 14 formed in and extending along the upper and lower side segments 16 as well as the outer side segment 18 of the guide members 10. The size, number and location of the plurality of apertures 14 may vary depending upon the overall size and configuration of each of the guide members 10. At least one purpose of the formation of the plurality of apertures 14 is to lessen the weight thereof while maintaining the strength and structural integrity of the guide and/or rail members 10 and 12, respectively which include the aforementioned apertures 14. Moreover one or more additional embodiments of the present invention includes the openings 14 being disposed and structured to facilitate the disposition of the various components in the self-contained orientation.

Other structural modifications which may be included in at least the rail members 12 comprise a stamped, corrugated or other integrally formed seam or crease 19 which may be provided in interior and exterior sides 19' of each of the one or more rail members 12. The integration of such structure serves to enhance the strength and/or rigidity integrity thereof. It is emphasized that the aforementioned modifications including the apertures 14, integrated seam 19, etc. may be absent from the guide members 10 and the rail members 12 without detracting from the performance characteristics of the dolly assembly 100.

As also represented in FIGS. 1 and 5, each of the guide members 10 include a hollow interior 20 extending along at least a majority and preferably along the entirety of the length thereof. As such, the hollow interior 20 of each of the guide members 10 is accessible and disposed in direct communication with an open longitudinal side 22, which also extends along at least a majority, but preferably the entirety, of the length of each of the guide members 10. Also, closed ends 24 may or may not be included at opposite ends of each of the guide members in at least partially closing relation to the ends of the respective hollow interiors 20 of each of the guide members 10. When present, the closed ends 24 facilitate intended retaining features of the dolly assembly 100 when in the self-contained orientation of FIGS. 4 and 5.

Mobility of the dolly assembly 100, when in the operative orientation is facilitated by a movable support assembly preferably comprising a plurality of castors as at 30 and/or 30'. The number and location of the plurality of castors 30 or 30' removably connected to the dolly assembly may vary depending upon the overall size and configuration thereof. More specifically, at least one preferred embodiment of the dolly assembly 100 includes a plurality of two guide members 10 being disposed in spaced, interconnecting relation by a plurality of two rail members 12. However, as indicated the overall shape and size of the dolly assembly 100 may vary so as to accommodate the movable support of a variety of objects or devices, which may differ in size, weight, configuration, etc.

Figure 2:
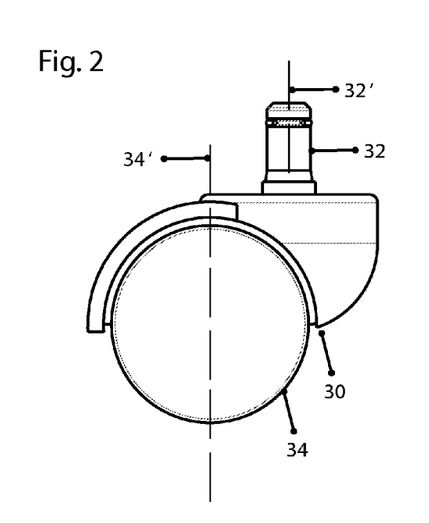
FIG. 2 is a detailed view of one of a plurality of castors which may be removably connected to and movably support the dolly when in the operative orientation of FIG. 1.
Figure 2A:
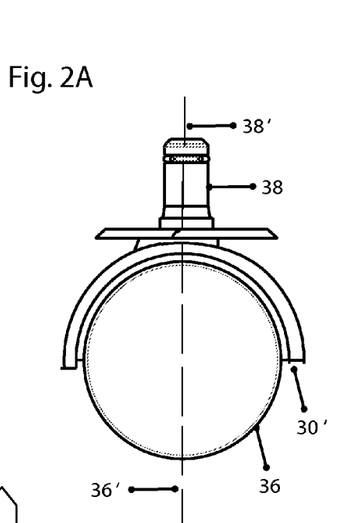
FIG. 2A is another embodiment of one of a plurality of castors which may be connected to and movably support the dolly when in the operative position of FIG. 1.

Moreover and with specific reference to FIGS. 2 and 2A, the castors 30 may include off-set castor construction including a link or stem 32 having its longitudinal axis 32' at least partially offset from the center or diameter 34' of the wheel or roller 34. In contrast, at least one preferred embodiment the dolly assembly 100 is movably supported by a plurality of an in-line castors 30' such as a ball castor, as represented in FIG. 2A. As schematically represented, the movable or rolling support in the embodiment of 2A comprises an in-line castor comprising a ball type roller 36 connected to a mounting stem or link 38 in an in-line orientation. As used herein, the term "in-line" when referring to the ball castor 30' of FIG. 2A is meant to describe the longitudinal axis 32' of the connecting stem or link 38 being disposed coincident with the center and/or diameter 36' of the ball 36. One advantage of the in-line castor construction 30' of the embodiment of FIG. 2A is an added strength and/or improved operation, in that longitudinal and/or diametric axis 36' and 38' are inline with one another. As a result, any weight supported by the ball or inline castor 30' will pass through the center of the castor 30'. In contrast, the off-set castor construction 30 of the embodiment of FIG. 2 differs in that any weight supported thereby will not pass through the center of the wheel or roller 34 as indicated, but be vectored at least partially along both axis 32' and 34'.

Figure 3:
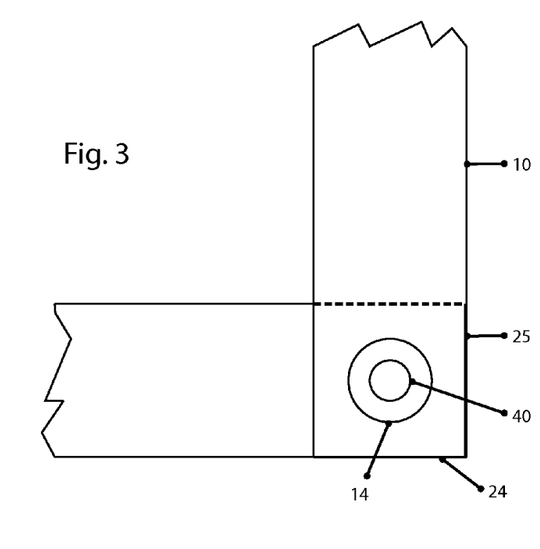
FIG. 3 is a bottom view and partial cutaway of an intersecting junction of components of the embodiment of FIG. 1 and a location where one of a plurality of castors is removably connected thereto.

With regard to FIG. 3, removable interconnection of the castor 30 or 30' to the dolly assembly 100, when in its operative orientation of FIG. 1, may be accomplished by mounting apertures or like structures 40 formed in the opposite ends or other appropriate location of the rail members 12. The mounting structures 40 are dimensioned and configured to receive and removably retain the connecting link 32 or 38 of the respective castors 30 and 30'. As such, the mounting aperture or structure 40 is disposed in aligned relation with a correspondingly disposed opening 14 in the lower or under side 16 of the guide members 10. It is again emphasized that in order to easily dispose the dolly assembly 100 in the self-contained orientation of FIGS. 4 and 5, the castors 30 or 30' are removably connected by insertion of the respective connecting links 32 and 38 through the corresponding aperture 14, into removable connecting relation with the mounting structures 40, formed in corresponding ends of each of the rail members 12.

An easy and effective positioning of the dolly assembly 100 between the operative orientation and the self-contained orientation is at least partially due to the cooperative structuring of the guide members 10 rail members 12 and castor members 30, 30'. More specifically, when in the operative orientation of FIG. 1, corresponding opposite ends of each of the one or more rail members 12 are disposed within the hollow interior 20 of corresponding ends or other portions of the guide members 10. Removable connection between the guide members 10 and rail members 12 may be at least partially accomplished by the insertion of the connecting links 32 and 38 of the corresponding castor structures 30 and 30' into the intersecting junctions 25, such as at the correspondingly disposed opposite ends of each of the guide and rail members 10 and 12 respectively. Moreover, the transverse dimension of the interconnecting rail members 12 and the transverse dimension of the hollow interior 20 of the guide members 10 may be such as to at least generally define a "frictional fit", which further facilitates the removable interconnection of the rail members 12 to the guide members 10 as represented in FIG. 1.

Further, when in the stored, self-contained orientation of FIGS. 4 and 5, each of the one or more rail members 12 are disposed within the interior of a corresponding guide member 10. Accordingly, the longitudinal dimension of each of the guide members 10 is sufficient to include and enclose the entire length of at least one rail member 12 as clearly represented in FIG. 5. Further, the stored and self-contained orientation of the dolly assembly 100 may also comprise at least one or a plurality of the castors 30, 30' being disposed within the hollow interior 20 of one or both of the guide members 10 concurrently to at least one of the rail members being disposed therein. Therefore, the transverse dimension of elongated, the open longitudinal side 22 of each of the one or more guide members 10 sufficient to facilitate passage there through of at least one rail member 12 as well as one or more castors 30, 30'. When so positioned, the stored, self-contained orientation may be further defined by the open longitudinal side 22 of each of the at least two guide members 10 being disposed in direct facing relation to one another such that the hollow interiors 20 thereof are also in direct communication and in enclosing relation to the self-contained rail members 12 and/or castors 30, 30'.

Due to the inclusion of an open longitudinal side 22 in each of the guide members 10, the self-contained orientation of FIGS. 4 and 5 may be further defined by a removable connection of the guide members 10 in facing, confronting relation to one another. When so connected, the open longitudinal sides 22 and the hollow interiors 20 of the guide members 10 are disposed in direct confronting and/or facing, communicating relation with one another. Such confronting relation of the guide members 10 may be more specifically described as the outer peripheral edges 22', of each of the open longitudinal sides 22 of each guide member 10, being disposed in a aligned, confronting and/or engaging relation with one another along at least a predetermined or majority of their respective lengths, as represented in FIGS. 4 and 5. Therefore, when in the self-contained orientation, the plurality of rail member 12 and the plurality of castors 30 or 30' will be enclosed, preferably in their entirety, within the hollow interiors 20 of the removably connected and confronting guide members 10. As a result, the dolly assembly 100 will have a significantly reduced "footprint" or size and configuration which significantly enhance its ability to be efficiently stored and/or transported in storage areas or transportation facilities having a reduced size and configuration. Further, efficiency in storage and/or transportation can be further enhanced by concurrently stacking, grouping or otherwise arranging a plurality of such dolly assemblies 100, when each is in the self-contained orientation.

Interconnection of the two guide members 10 in the stored, self-contained orientation of FIGS. 4 and 5 may be accomplished by including a variety of different connecting structures or devices. More specifically, various types of magnetic, mechanical and/or strap-like connectors may be applied to the exterior of the confronting guide members 10 so as to maintain the open longitudinal sides 22 in facing relating to one another while in the self-contained orientation. However, the mechanical, magnetic or other type of connecting facilities utilized to maintain the facing, hollow interior communicating relation of the guide members 10 in the configuration represented in FIGS. 4 and 5 is such as to also render their separation and assembly into the operative orientation of FIG. 1 relatively easy and in a short amount of time.

As clearly indicated, the operative orientation may be represented by the embodiment of FIG. 1, wherein the plurality of at least two guide members 10 are interconnected in spaced relation to one another by a plurality of at least two spaced apart rail members 12. When assembled in this manner represented, the guide members 10 and rail members 12 collectively define a substantially continuous closed peripheral configuration of the dolly assembly 100, wherein the center thereof may be substantially open. As indicated above, the number of rail members 12 may vary such as when the length of the guide members 10 are significantly increased for the purpose of movably supporting a larger, heavier or unusually configured object or device.

In contrast, the operative orientation may also comprise a plurality of guide members 10 disposed in interconnected, spaced apart relation by a single rail member 12 (not shown for purposes of clarity). When at least one rail member 12 is utilized to interconnect the guide members 10, it may be connected intermediate the opposite ends of the spaced apart guide members 10 so as to form a generally "I" or "H" configuration. In such an operative orientation, the plurality of castor 30 or 30' may still be disposed at opposite ends of the guide members 10 in order to provide meaningful stability and balance to the dolly assembly 100 when in this modified operative orientation. Therefore, the preferred embodiment of the dolly assembly 100 may vary in size and/or configuration by varying the length of the guide members 10 as well as the length and number of the rail members 12 as indicated.

Therefore, in at least one preferred embodiment, the dimension and structure of the guide members 10 are sufficient to enclose the rail members 12 being utilized, as well as the plurality of castors 30 or 30' needed to support the dolly assembly 100 in the aforementioned stable manner. As described above and represented in the accompanying Figures, the dimension and configuration of each of the one or more guide members 10 will differ from each of the one or more rail members 12. However, it is further emphasized that at least one embodiment of the present invention comprises at least some of the same or corresponding components of the dolly assembly being equally dimensioned and configured. More specifically, each of the two or more guide members 10 may be structured to be substantially equally dimensioned and configured with one another. Similarly, each of the two or more rail members 12 may be structured to be equally dimensioned and configured with one another. This feature will have the benefit of facilitating the design and/or manufacture of at least one embodiment of the dolly assembly 100 by structuring of the guide members 10 to be substantially identical and/or the structuring of the rail members 12 to be substantially identical. As a result, the manufacture of a plurality of guide members having different sizes and shapes and/or a plurality of rail members having different sizes and/or shapes will not be necessary.

Yet another preferred embodiment of the dolly assembly of the present invention is represented in FIGS. 6 through 14 and generally indicated as 100'. The dolly assembly 100' includes substantially similar or equivalent structural features and components as that of the embodiment of FIG. 100, as represented in FIGS. 1 through 5. More specifically, the dolly assembly 100' is selectively disposable into an operative, weight bearing orientation represented in FIGS. 6-9A or in the substantially collapsed or self-contained orientation of FIGS. 11, 13 and 14. Also, when in the operative position, at least two guide members 10 are interconnected in spaced relation to one another by at least one, but preferably a plurality of two rail members 12. As also represented, the rail members 12 may include apertures or openings 14 dimensioned and configured to receive passage of a castor 130 at least partially there through so as to facilitate placement of the dolly assembly 100' in the self-contained orientation, as represented in greater detail in FIGS. 12 and 14.

Figure 12:
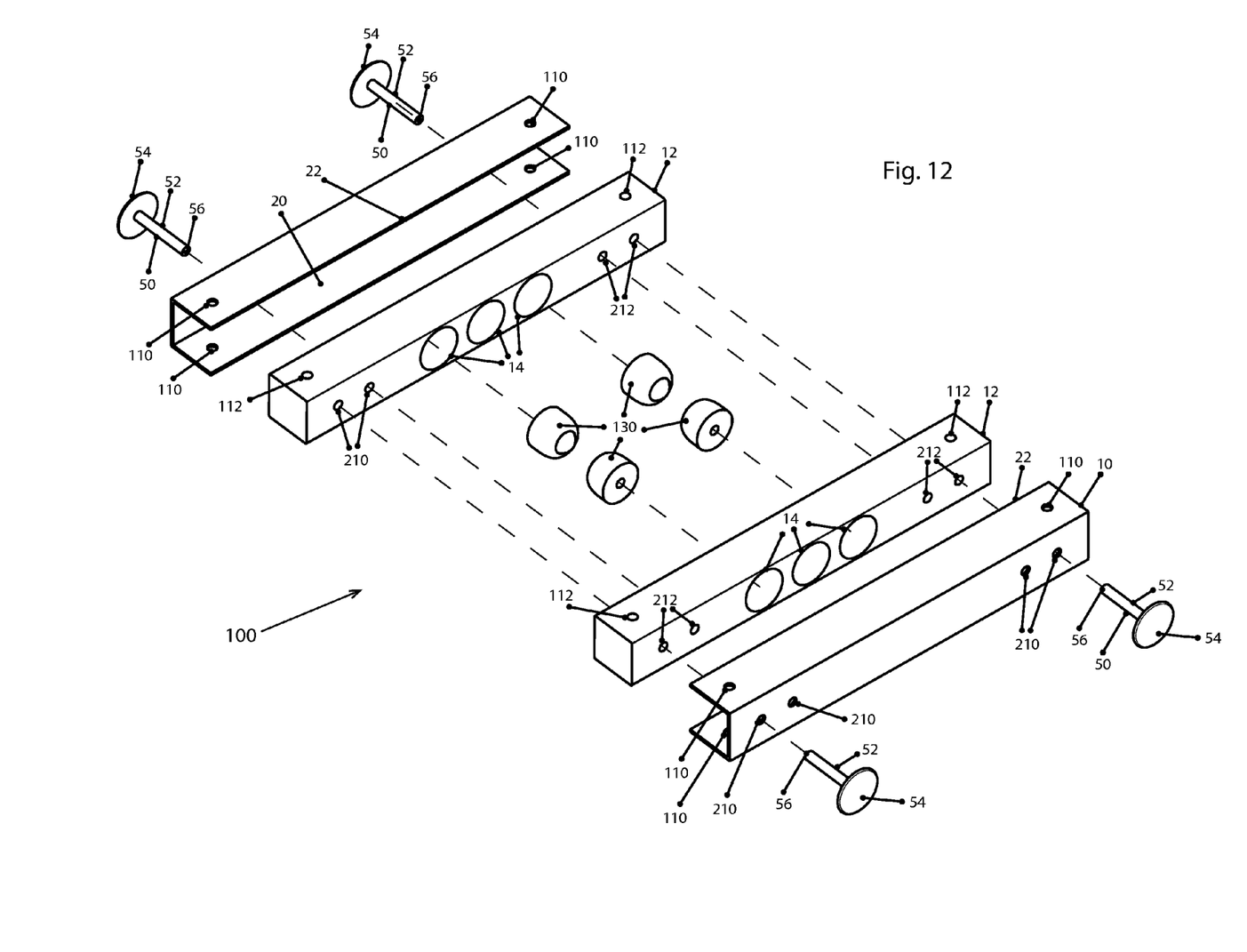
FIG. 12 is an exploded view of the embodiment of FIG. 11 in an unassembled form.
Figure 13:
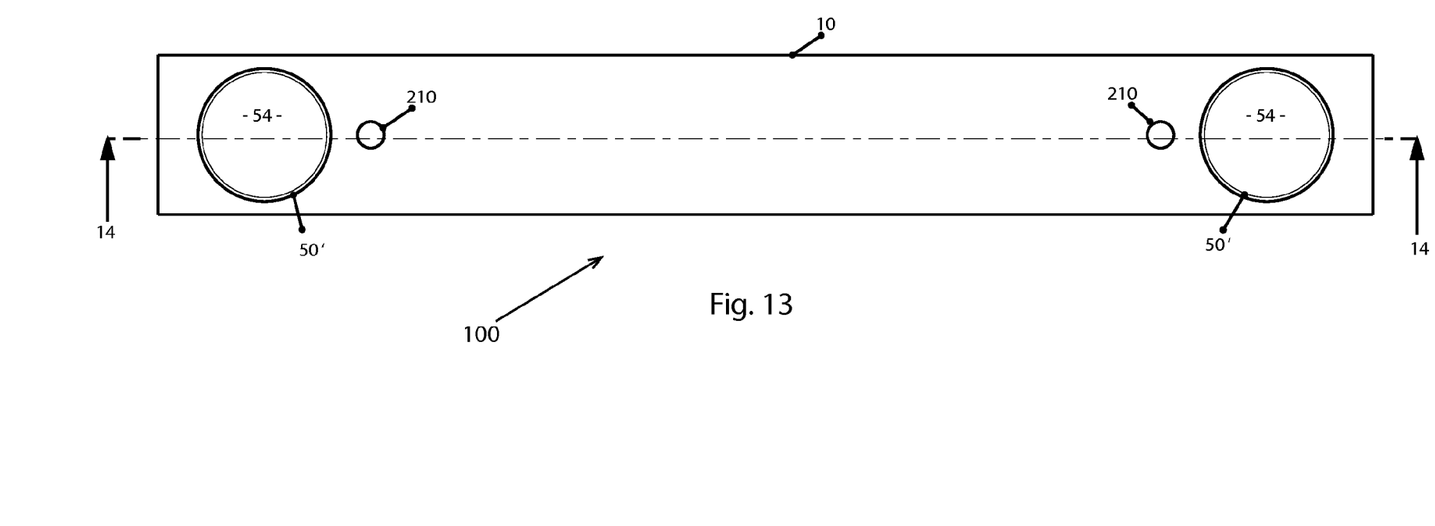
FIG. 13 is a front view of the embodiment of FIG. 11 in assembled form.

Also, at least one but preferably each of the plurality of guide members 10 includes an open longitudinal side 22 having a sufficient transverse dimension to facilitate passage there through of at least one of the rail members 12, as represented in the exploded view of FIG. 12. When so positioned, the rail member 12 is disposed within the hollow interior of the guide member 10 in substantially longitudinally aligned relation to the length of the guide member 10 and the hollow interior 22. Further, the self-contained orientation of the dolly assembly 100', as represented in FIGS. 11 through 14, similarly comprises the open longitudinal sides 22 disposed in substantially confronting and/or facing relation with one another, such that their peripheral portions or edges 22' may be aligned, engaged and/or confront one another.

Figure 7:
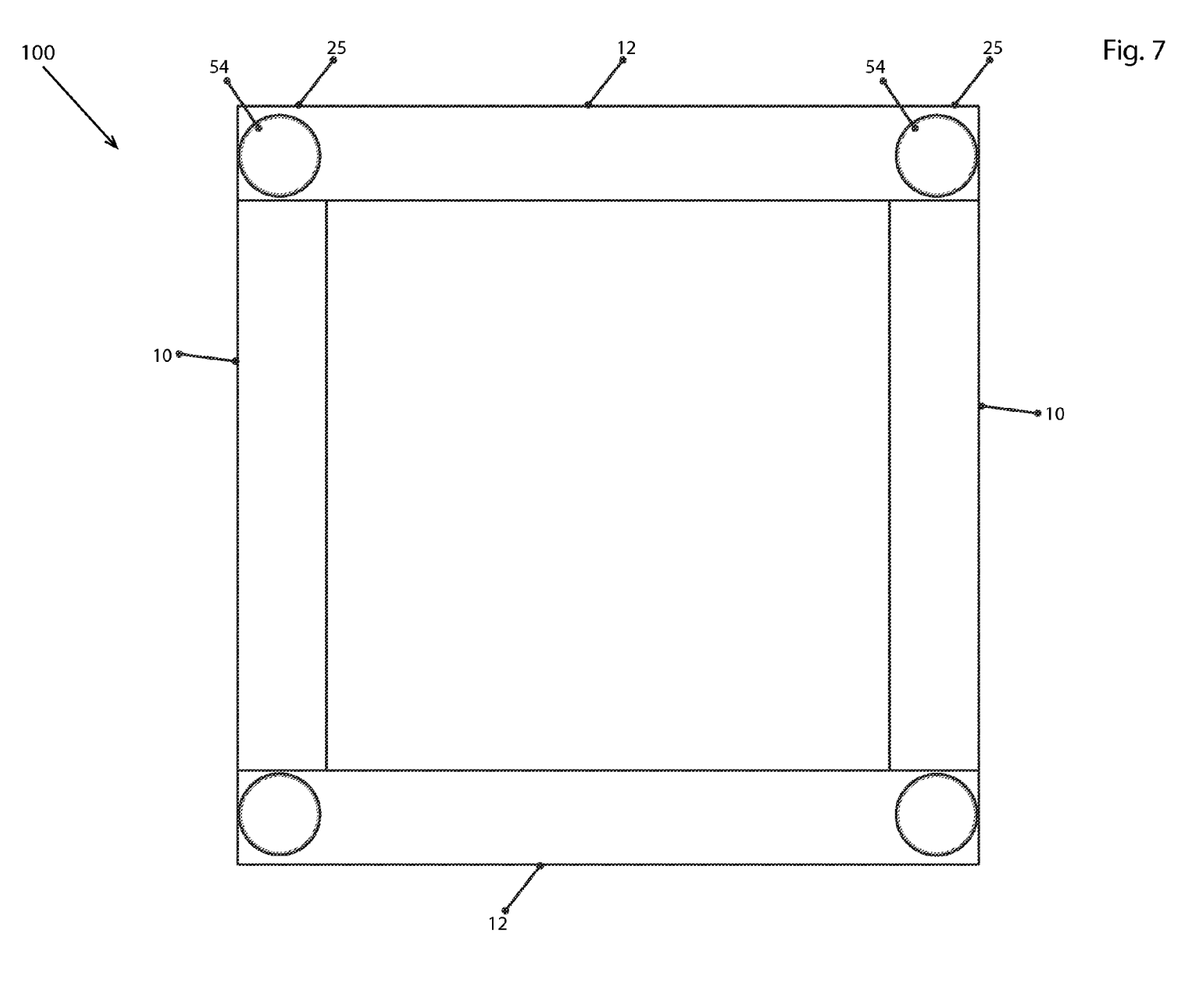
FIG. 7 is a top plan view of the embodiment of FIG. 6.
Figure 8:
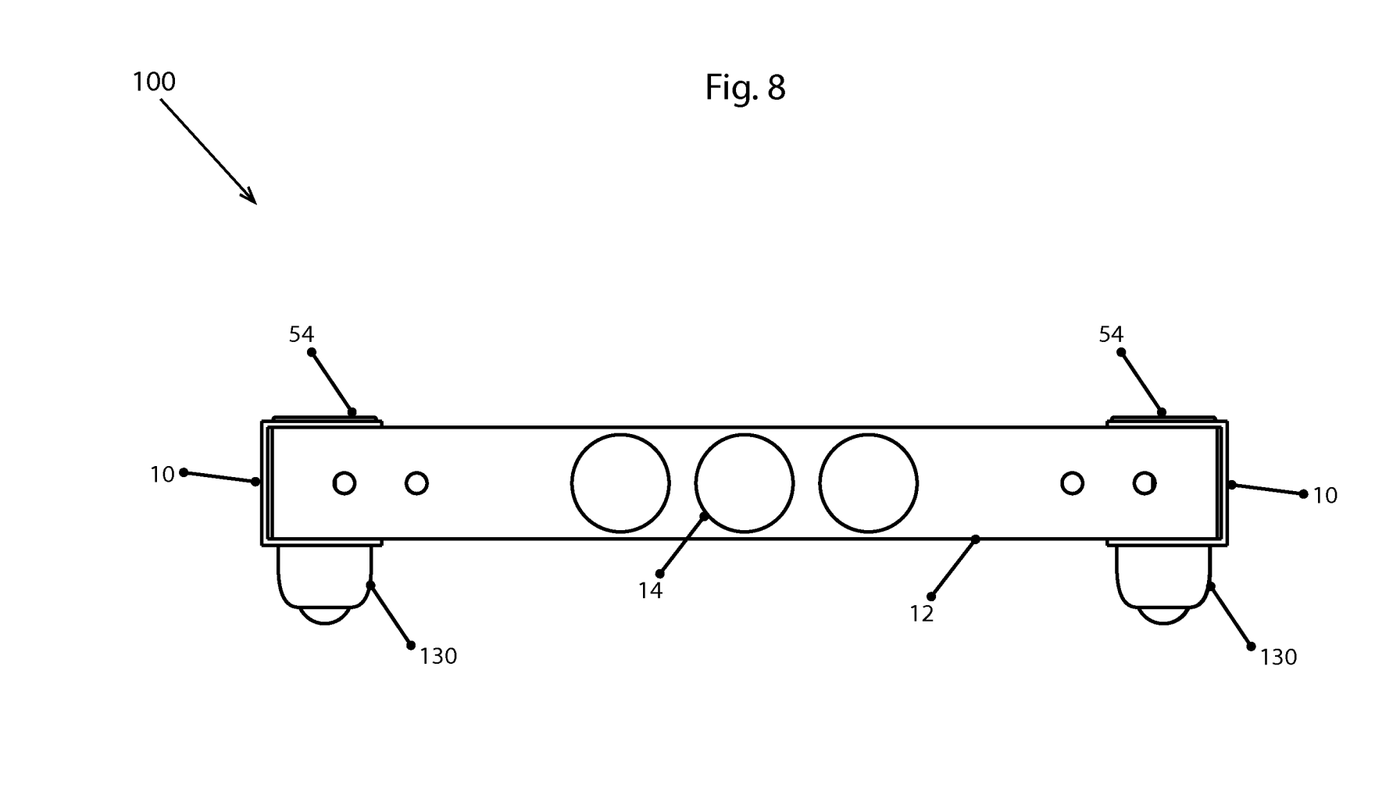
FIG. 8 is a side view of the embodiment of FIG. 7 in an operative position.
Figure 9:
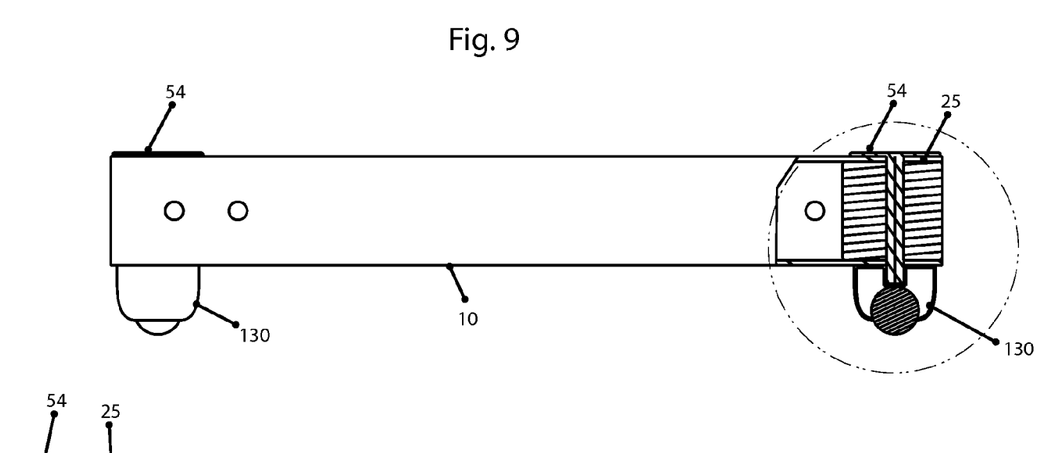
FIG. 9 is a front view in partial cutaway of the embodiment of FIGS. 7 and 8 in an operative orientation.
Figure 9A:
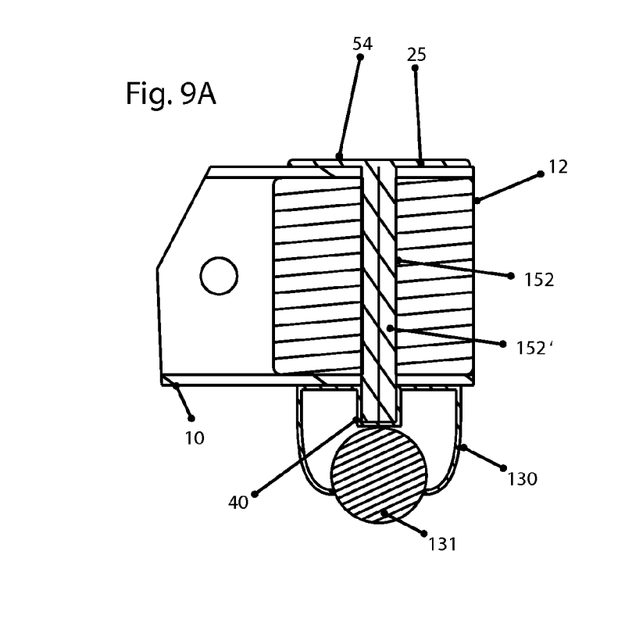
FIG. 9A is a detailed view in partial cutaway of an indicated portion of FIG. 9.
Figure 10:
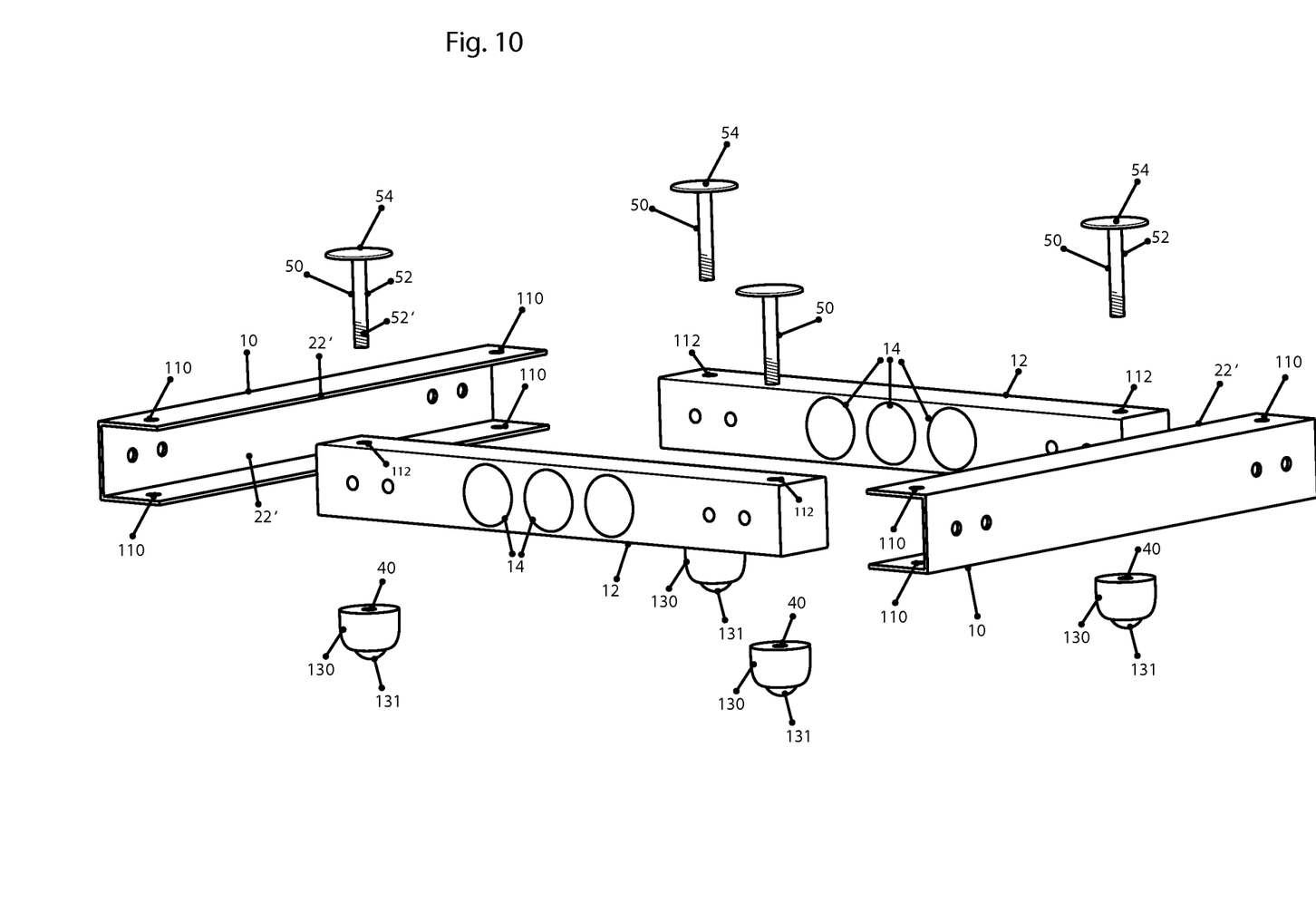
FIG. 10 is an exploded view representing the various components of the embodiments of FIG. 7 through 9 in an unassembled form.
Figure 11:
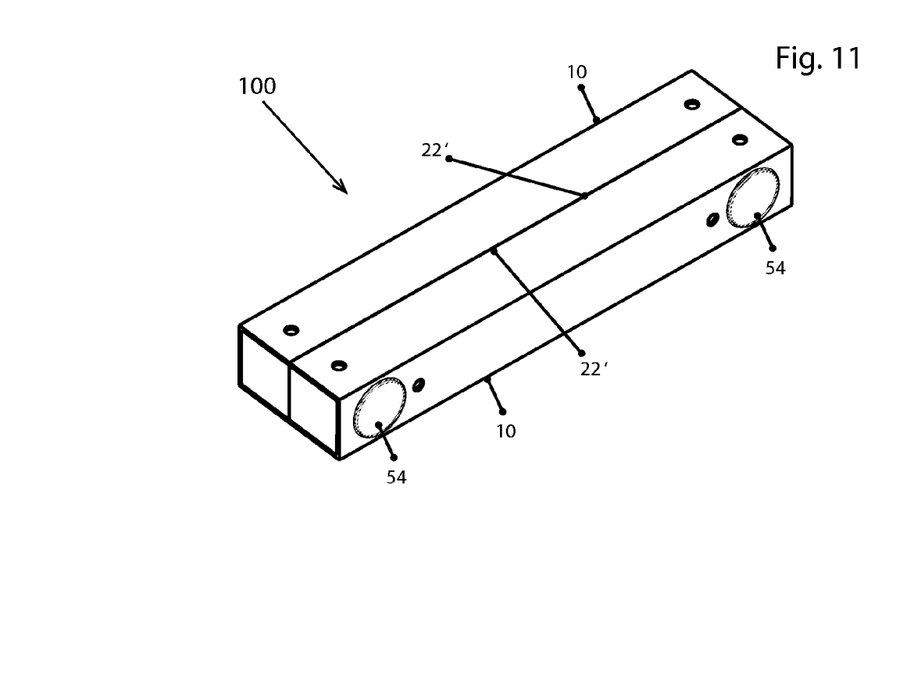
FIG. 11 is a perspective view of the embodiment of FIGS. 6-10 in a self-contained orientation.

As with the embodiment of FIGS. 1 through 5, the self contained orientation of FIG. 7 may be maintained utilizing any of a plurality of different connectors or connecting structures, such as surrounding cords, straps, wrappings and/or mating or engaging magnetic or mechanical connectors. However, as more clearly represented in FIGS. 12 and 14, one additional preferred embodiment of the present invention includes the use of at least one but preferably a plurality of two or more connector members 50. As set forth in greater detail hereinafter, each of the connectors has an elongated shaft 52 and an enlarged or expanded head portion 54 connected to one end of the shaft 52. In addition, at least a portion of the length of each of the shafts 52 has an externally threaded or other equivalent structure 52' which facilitates its removable connection with at least one of the castor structures 130 as represented in detail in FIGS. 9 and 9A. More specifically, while the entire length of the shaft 52 may be externally threaded or otherwise structured and configured to include some type of connecting structure, at least a designated portion of the length, preferably adjacent to the free end 56 is externally threaded or otherwise structured to include the connecting facility 52'.

The versatility of the embodiment of FIG. 6 through 14 is further demonstrated by the multiple functions of the connector members 50. Moreover, each of the connector members 50 is structured to interconnect correspondingly disposed opposite ends 10' and 12' at one of the connected junctions 25, when the dolly assembly 100' is in the operative orientation of FIGS. 6 through 9A. Further, each of the opposite ends 10' and 12' respectively include apertures or holes 110 and 112. The intended positioning of the opposite ends 10' and 12' of the guide and rail members 10 and 12, when assuming the operative orientation, serves to axially align the apertures 110 and 112 in the correspondingly disposed opposite ends 10' and 12' to form the connecting junctions 25. In order to maintain this interconnection, the shaft 52 of a different one of the plurality of connectors 50 is inserted through the axially aligned apertures or openings 110, 112 in the opposite ends 10' and 12' forming each of the connected junctions 25.

Moreover, due to the provision of an external thread or other connecting configurations 52' and the predetermined length of the shaft 52, the free end of each of the shafts 52 may be removably connected, with a correspondingly positioned castor 130. In accomplishing such removable connection, a mounting structure, such as an internally threaded socket 40' will receive and be removably threaded onto the connecting portion 52' of each of the connector members 50. As should be apparent the length of each of the shafts 52 is such as to have the connecting portions 52' thereof pass at least minimally out of the corresponding interconnected junction 25 and into the removable and/or threaded engagement with the castors 130. Also, in the embodiment of FIGS. 6 through 14, each of the castors 130 are preferably structured to define "in-line" castors such as a ball type castor, including a roller ball 131, similar to, but distinguishable from, the castor 30' as represented in FIG. 2A.

In order to maintain the interconnected relation of each of the connector members 50 relative to the junctions 25, the enlarged head portion 54 thereof rests on the outer surface or portion of corresponding ones of the guide members 10 as clearly represented in FIGS. 6-10. Therefore, the enlarged head portions 54 of each of the connector members 50 will be exposed on an outer or upper portion of the dolly assembly 100' when in its operative orientation. Concurrently, the correspondingly disposed and removably connected castors 130 will be connected to and disposed on the under portion of the dolly assembly 100'. Further, the size, shape and/or material from which each of the enlarged head portions 54 are formed may also facilitate their use as friction and/or cushioning pads, which are disposed to engage the one or more objects disposed on the upper or outer surface of the dolly assembly 100' when such an object(s) is being movably supported.

Figure 14:
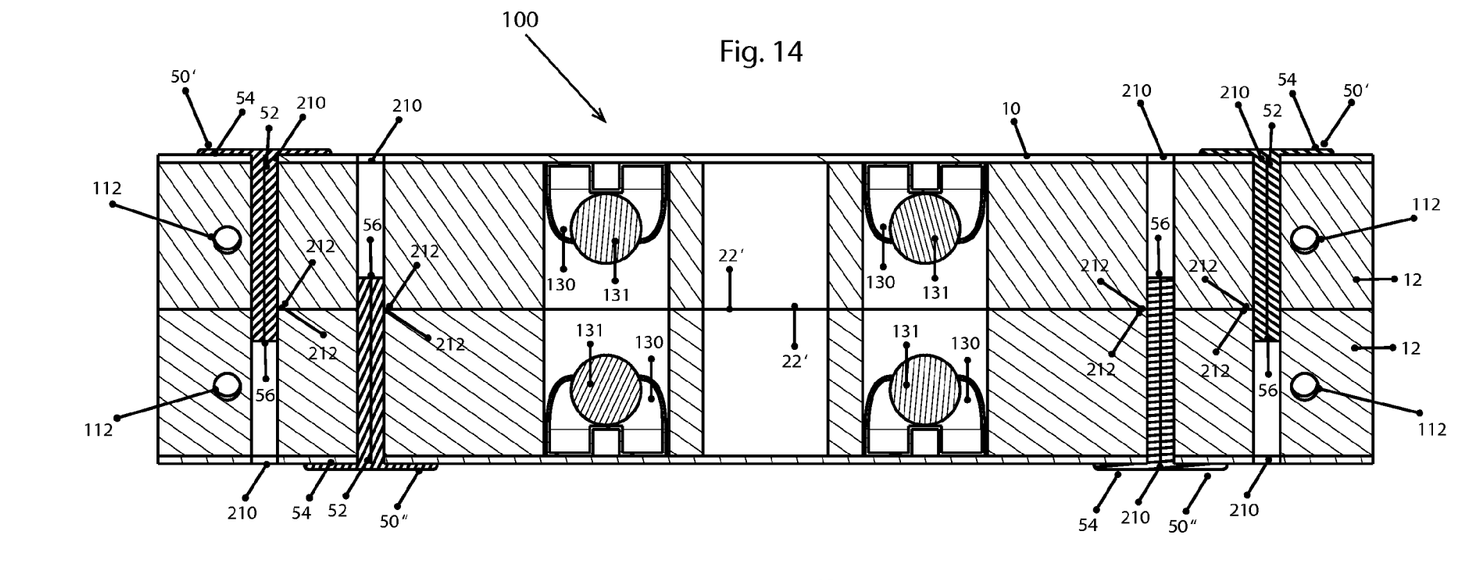
FIG. 14 is a sectional view of the embodiment of FIG. 13 along line 14-14.

As set forth above, the plurality of connector members 50 have a multiple function in that they collectively serve to maintain the stability of the connected junctions 25 while removably attaching the plurality of castors 130 in movably supporting relation to the dolly assembly 100'. In addition, and with specific reference to FIGS. 12 through 14, the connector members 50 may be removed from their interconnecting relation with the junctions 25 when it is intended to disassemble the dolly assembly 100' and arrange it in the self contained orientation of FIG. 11. More specifically, each of the guide members 10 include retaining apertures 210 formed on and extending through one side thereof. In cooperation therewith, each of the rail members 12 includes retaining apertures 212 formed on each of two opposite sides. Once the rail members 12 are disposed within the hollow interior 20 of corresponding ones of the guide members 10, the retaining apertures 210 and 212 are disposed in aligned relation to one another as clearly and schematically represented in FIG. 12. In such an aligned orientation and as clearly represented in FIG. 14, at least one but preferably and more practically a plurality of at least two connectors 50 are inserted from the exterior of opposite ones of the guide members 10 through the retaining apertures 210 and further through the retaining apertures 212 of the corresponding rail members 12. The length of each of the shafts 52 is sufficient to extend completely through correspondingly disposed guide members 10 and rail members 12, such that the outer or distal free end 56 penetrates into the oppositely disposed rail member 12. Once so disposed, the free end 56 of each of the connectors 50 is threadedly or otherwise connected to a correspondingly disposed and aligned retaining aperture 112 of an opposite rail member 12 penetrated by the free end 56. Moreover, due to the enlarged head 54 engaging the outer portion or surface of the confronting guide members 10 along with the distal ends 56 being threadedly or otherwise attached to the retaining aperture 212 in the oppositely disposed rail member 12, as represented in FIG. 14, the dolly assembly 100' will be removably maintained in the self contained orientation. It should be further noted that at least two of the connectors, such as at 50' and 50" in FIG. 14, are "reversely oriented" in order to initially enter through different ones of the confronting guide members 10. Such a reverse orientation, along with the enlarged head 54 engaging the outer portions of the guide members, which they initially enter, will assure a firm but removable attachment of the guide and rail members 10 and 13 respectively in the collapsed orientation of FIGS. 11 and 14. Moreover, the confronting guide and rail members 10 and 12 can be accurately described as being "sandwiched" between the enlarged heads 54 of the reversely oriented connectors 50' and 50".

Further with regard to FIGS. 12 and 14, the storage of the castors 130 into the interior of the rail members 12 is accomplished by cooperative dimensioning of the openings 14 and each of the castors 130. Therefore, once the castors 130 are disconnected from the dolly assembly 100', when in its operative position, they are passed into the interior of one of the rail members 12, through the openings 14 as schematically represented in FIG. 12. The stored position of the castors 130 is represented in FIG. 14 once they have passed through the openings 14 into the interior of one of the rail members 12 and when the rail members 12 are disposed within the hollow interior of the guide members 10.

Further with regard to the self-contained orientation of the dolly assembly 100, as represented in FIGS. 4 and 5, the overall "footprint" is sufficiently reduced in size and configuration to enable a single dolly assembly 100 or a plurality of dolly assemblies 100 to be efficiently stored and/or transported in a smaller area or facility. In addition, when a plurality of the dolly assemblies are concurrently stored, or transported, the reduced size and configuration of each dolly assembly as represented in FIGS. 4 and 5, may facilitate there being arranged in a stacked array or other appropriately configured grouping, best suited for storage, transportation, handling, etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A dolly assembly structured to be disposable between operative and self-contained positions, said dolly assembly comprising:

a plurality of at least two elongated guide members each including an open longitudinal side and a hollow interior extending along the length thereof, a plurality of at least two elongated rail members, said two guide members and said two rail members cooperatively structured to be disposed in either an operative orientation or a self-contained orientation, a plurality of castors disposable in movable, supporting relation to said guide members and said rail members, said operative orientation comprising said two rail members removably interconnecting said two guide members in spaced relation to one another, said self-contained orientation comprising said open longitudinal sides of said two guide members disposed in facing, confronting engagement with one another and said hollow interiors thereof disposed in directly communicating relation with one another, and two rail members and said plurality of castors collectively and concurrently enclosed within said directly communicating hollow interiors of said two guide members, wherein at least said plurality of castors are detached from said guide members.

2. A dolly assembly as recited in claim 1 wherein said self-contained orientation further comprises said at least two rail members disposed in substantially longitudinal alignment within at least a majority of a length of said hollow interiors of said two guide members.

3. A dolly assembly as recited in claim 1 wherein each of said two guide members includes said open longitudinal side extending along at least a majority of the length thereof; each of said open longitudinal sides having a transverse dimension sufficiently larger than a transverse dimension of either of said two rail members to facilitate passage of either of said two rail members through said open longitudinal side into substantially longitudinal alignment with said hollow interior of either of said two guide members.

4. A dolly assembly structured to be disposed between operative and self-contained positions, said dolly assembly comprising:

a plurality of at least two elongated guide members each having a hollow interior extending along at least a portion of the length thereof and an open longitudinal side extending along the length of said hollow interior in direct communicating relation therewith, plurality of at least two elongated rail members each removably interconnecting said two guide members in spaced relation to one another to at least partially define an operative, weight supporting orientation, a plurality of castors connected in movable supporting relation to said interconnected guide and rail members at least when in said weight supporting, operative orientation, a self-contained orientation comprising said open longitudinal sides of said two guide members removably connected in facing, confronting relation to one another and said hollow interiors thereof disposed in directly communicating relation to one another; said hollow interiors collectively disposed in enclosing relation to at least said two rail members and said plurality of castors, concurrently to said two rail members and said plurality of castors being detached from said two guide members, and each of said open longitudinal sides comprising a transverse dimension sufficiently large to facilitate passage of at least one of said rail members there through into said hollow interior thereof, in substantially longitudinally aligned relation to the length of a corresponding one of said guide members.

5. A dolly assembly as recited in claim 4 further comprising at least one connector member having an elongated shaft, said shaft extendable through one of said connected junctions in interconnecting relation to corresponding ones of said opposite ends of said guide member and rail member and in connecting relation to one of said plurality of castors, when in said operative orientation.

6. A dolly assembly as recited in claim 5 wherein said connector member includes a head portion connected to one end of said shaft and disposed on an outer portion of said junction, one end of said shaft, opposite to said head portion, connecting said one castor to an under portion of said one junction.

7. A dolly assembly structured to be disposed between operative and self-contained positions, said dolly assembly comprising:

a plurality of at least two elongated guide members each having a hollow interior extending along at least a portion of the length thereof, a plurality of at least two elongated rail members, said two guide members and said two rail members cooperatively structured to be collectively disposed in either an operative, weight supporting orientation or a self-contained orientation, each of said plurality of at least two elongated rail members removably interconnecting said two guide members in spaced relation to one another to at least partially define said operative, weight supporting orientation, a plurality of castors connected in movable supporting relation to said interconnected guide and rail members at least when in said operative, weight supporting orientation, said self-contained orientation comprising said hollow interiors of said two guide members disposed in directly communicating relation to one another, and said self-contained orientation further comprising said two rail members and said plurality of castors collectively and concurrently enclosed within said directly communicating hollow interiors of said two guide members, in detached relation to said guide members.

8. A dolly assembly as recited in claim 7 further comprising said two guide members dimensioned and structured to concurrently and collectively enclose said two rail members within and in substantially longitudinal alignment with said hollow interiors when in said self-contained orientation.

9. A dolly assembly as recited in claim 8 wherein each of said two guide members includes an open longitudinal side; said self-contained orientation further comprising said open longitudinal sides of said two guide members removably connected in facing, confronting relation to one another concurrently to said hollow interiors thereof disposed in said directly communicating relation, said hollow interiors thereof collectively enclosing at least said two rail members and said plurality of castors in said detached relation to said guide members.

10. A dolly assembly as recited in claim 9 wherein each of said open longitudinal sides comprises a transverse dimension sufficiently large to facilitate passage of at least one of said rail members there through into said hollow interior thereof, in substantially longitudinally aligned relation to the length of a corresponding one of said guide members.

11. A dolly assembly as recited in claim 7 wherein each of said guide members comprises a length sufficient to concurrently receive and enclose an entire length of at least one of said rail members and at least one of said plurality of castors within said hollow interior thereof.

12. A dolly assembly as recited in claim 7 wherein said operative, weight bearing orientation comprises a plurality of connected junctions comprising opposite ends of each of said guide members connected to correspondingly disposed opposite ends of a different one of said rail members.

13. A dolly assembly as recited in claim 12 further comprising at least one connector member having an elongated shaft, said shaft extendable through one of said connected junctions in interconnecting relation to corresponding ones of said opposite ends of said guide member and rail member and in connecting relation to one of said plurality of castors, when in said operative orientation.

14. A dolly assembly as recited in claim 13 wherein said shaft of said one connector member is disposed in interconnecting relation between said two guide members and corresponding ones of said rail members, when in said self-contained orientation.

15. A dolly assembly as recited in claim 7 further including at least two connector members each having an elongated shaft; said self-contained orientation further comprising each of said shafts extending through a different one of said guide members and a corresponding one of said rail members into connected relation with oppositely disposed ones of said rail and guide members.

16. A dolly assembly as recited in claim 15 wherein each of said connector members includes an enlarged head portion connected to one end of said shaft and disposed in abutting relation to an outer surface of a correspondingly disposed, different one of said guide members.

17. A dolly assembly as recited in claim 7 wherein said self-contained orientation further comprises at least one of said castors disposed within one of said rail members concurrently to said one rail member disposed within said hollow interior of one of said guide members.

* * * * *